United States Patent [19]

Shimada et al.

[11] 4,409,964
[45] Oct. 18, 1983

[54] SOLAR HEAT COLLECTOR ASSEMBLY

[75] Inventors: Mitsuhiro Shimada; Atsuyuki Katto, both of Nara, Japan

[73] Assignee: Sharp Kabushiki Kaisha, Osaka, Japan

[21] Appl. No.: 212,621

[22] Filed: Dec. 3, 1980

[30] Foreign Application Priority Data

Dec. 22, 1979 [JP] Japan .................. 54-184258[U]

[51] Int. Cl.³ .............................................. F24J 3/02
[52] U.S. Cl. ..................................... 126/443; 126/446
[58] Field of Search ............................... 126/443, 446

[56] References Cited

U.S. PATENT DOCUMENTS

| 4,080,954 | 3/1978 | DeWilde ............................ 126/443 |
| 4,119,085 | 10/1978 | Knowles et al. ................. 126/443 |
| 4,186,725 | 2/1980 | Schwartz ........................... 126/443 |
| 4,308,857 | 1/1982 | Sims ................................... 126/443 |
| 4,313,423 | 2/1982 | Mahdjuri ........................... 126/443 |

Primary Examiner—Ronald C. Capossela
Attorney, Agent, or Firm—Birch, Stewart, Kolasch and Birch

[57] ABSTRACT

A solar heat collector assembly includes a cylindrical transparent tube having an open end portion hermetically sealed by the use of a sealant and being held in vacuum state and a heat-collecting pipe secured in the transparent tube with its end portion extending outside the transparent tube through the sealant. The sealant is made of a thermally-nonconducting and anti-corrosion material with a softening point higher than that of the transparent tube. Especially, the sealant is made of ceramics or crystallized glass.

9 Claims, 4 Drawing Figures

SOLAR HEAT COLLECTOR ASSEMBLY

BACKGROUND OF THE INVENTION

The present invention relates to a solar heat collector.

There are generally two kinds of solar heat collectors in the art: one wherein a proper vehicle (for example, water) is supplied and circulated within a rectangular box and the other wherein a narrow copper tube is inserted into a cylindrical vacuum glass tube for passage of a proper vehicle. When it is desired to achieve air-conditioning through the utilization of solar heat energy, the latter vacuum tube type is the only effective way in elevating the temperature of the vehicle to a desired value. Accordingly, the vacuum tube type of solar heat collectors seems to be more promising but has still a variety of problems especially in conjunction with manufacturing techniques and operating life.

More particularly, reference is now made to FIGS. 1 and 2 to give a better understanding of these aspects. In FIGS. 1 and 2, there are illustrated an outer glass tube 1 which serves as a transparent cover and a casing and a cylindrical fin structure 2 which assumes a selective absorbent overlaying at least on its outer surface and is made of typically aluminum by a wellknown extrusion molding. A heat-collecting pipe 3 made typically of copper and in heat conducting contact with the cylindrical fin structure 2 provides a passage for the vehicle which is to be heated by removing from the cylindrical fin structure 2, the heat absorbed therein. A sealant 4 is provided at one end of the outer glass tube 1. In order to tightly secure the sealant 4 to the outer glass tube 1, it is desirable that the sealant 4 be made of a material which has substantially the same coefficient of thermal expansion as that of the glass tube 1, for example, iron-nickel-chromium alloy and be bonded to the outer glass tube 1 by the use of a proper adhesive such as low melting point glass frit. Furthermore, the sealant 4 is attached to the collecting pipe 3 through wax. The outer glass tube 1, combined with the sealant 4, forms a vacuum chamber. A vacuum cavity 5 is defined by the outer glass tube 1 and the sealant 4 and brought into a vacuum state with the aid of a vacuum pump connected to a chip tube (not shown). A spacer 6 made of a ceramic material, for example, is provided to secure the cylindrical fin structure 2 in place in the interior of the outer glass tube 1. Since the heat collecting pipe 3 is off center of with respect to the outer glass tube 1, the force resulting from thermal expansion does not act evenly on the sealant 4 and eventually destroys part of the bonding section even though measures are taken to absorb such an uneven force. It is therefore necessary that the glass 1, the sealant 4 and the adhesive 7 have substantially the same coefficient of thermal expansion to maintain a tight and lasting adhesion between elements. A proper sealant material may be an Fe-Ni alloy and a 426 alloy in conjunction with soda glass and Kover in conjunction with class II hard glass. A desirable adhesive may be a low melting point glass having a coefficient of thermal expansion equal to that of the glass tube and the sealant. However, in the event that a metallic material such as a 426 alloy and Kover is exposed to the atmosphere, it will become rusted and corroded. For these reasons such material is disadvantageous for use in solar heat collector assemblies. Anti-rust treatment seems necessary for surfaces of these metallic materials and is actually achieved by plating or depositing a rust proofing coating thereon. Such treatment is however less reliable for a prolonged period of time.

While the outer glass tube 1 is sealed with the metallic sealant 4, a considerable amount of heat is liberated from the sealant 4 and the heat-collecting pipe 3.

OBJECTS AND SUMMARY OF THE INVENTION

Accordingly, it is an object of the present invention to provide an improved solar heat collector assembly wherein a reduced amount or no metallic material is used for a bonding section with a minimum amount of heat loss and a maximum amount of corrosion resistance.

According to one preferred embodiment of the present invention, there is provided a solar heat collector assembly including a cylindrical transparent tube having an open end portion hermetically sealed by the use of a sealant and being held in a vacuum state and a heat-collecting pipe secured in the transparent tube with its end portion extending outside the transparent tube through the sealant. The sealant is made of a thermally-nonconducting and anti-corrosion material with a softening point higher than that of the transparent tube. Preferably, the sealant is made of a ceramic material or crystallized glass.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
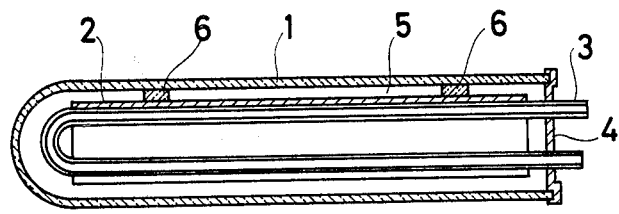
FIG. 1 is a cross-sectional view of a prior art solar heat collector assembly.
Figure 2:
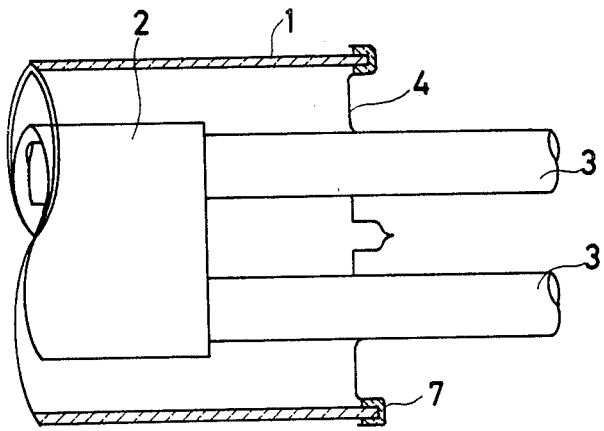
FIG. 2 is an enlarged cross-sectional view of an essential part of the prior art assembly.
Figure 3:
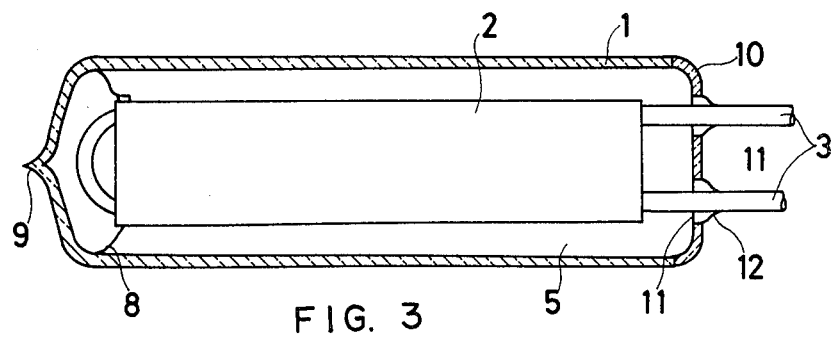
FIG. 3 is a cross-sectional view of a solar heat collector assembly constructed according to the present invention.
Figure 4:
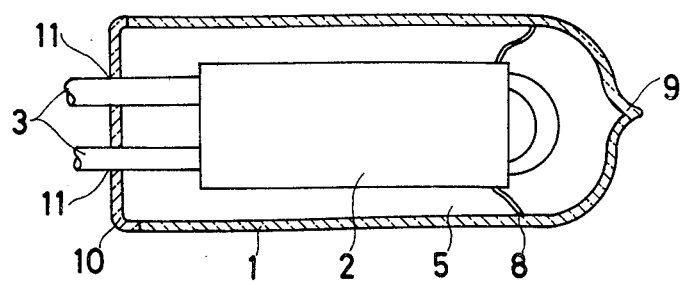
FIG. 4 is a cross-sectional views of another embodiment of the present invention.

Reference is now made to FIGS. 3 and 4 which illustrate the solar heat collector assembly according to a preferred embodiment of the present invention. Similar reference designations as used in FIGS. 1 and 2 are provided in FIGS. 3 and 4 wherever possible to designate similar elements. In FIG. 3, a spacer 8 having its one end connected to the cylindrical fin structure 2 is secured at the center of the glass tube 1. A discharging chip tube 9 is provided to lace the glass tube 1 into a vacuum state. A sealant 10 is bowl-shaped with the same shape and dimension as the open end portion of the glass tube and made of typically crystallized glass or ceramics. The outer periphery of the sealant 10 is molten and bonded to the open end portion of the outer glass tube 1 as seen from FIG. 3. Apertures 11 are formed at the center of the sealant 10 to lead the heat-collecting pipe 3 to the outside of the glass tube 1. A hermetic seal is built between the apertures 11 and the heat-collecting tube 3 through the use of a proper sealing metal material having substantially the same coefficient of thermal expansion as that of the sealant 10 (for example, 426 alloy when soda glass is used). Since the heat-collecting pipe 3 typically made of copper and the sealing metal material permit metal-to-metal bonding, both can be bonded together by a well-known technique such as silver-waxing or welding. It is also possible and easy to heat and bond the sealing metal material 12 and the sealant 10 because of similarity of the coefficient of thermal expansion of the two. In addition, the processing and bonding of the sealant 10 and the glass tube 1 is very easy to achieve as long as the tube 1 and the sealant 10 are both glass and substantially the same coefficient of thermal expansion. It is believed that the sealing metal material 12 demonstrates good adhesion to the sealant 10 via an oxide which is deposited on a surface of the metal material 12 and diffused into the interior of the sealant. It is clear from the foregoing that the thickness of the sealing metal material 12 should be as small as possible, typically 6 to 10 mm.

In order to manufacture the solar collector assembly of FIG. 3, the sealant 10 and the heat-collecting pipe 3 to which the fin structure is previously attached are tightly bonded through the use of the sealing metal material 12. The resulting assembly is inserted into the glass tube 1 from the heat-collecting fin side 2. After being placed in register with each other, the open end portion of the glass tube 1 and the outer periphery of the sealant 10 are heated and bonded. If the glass tube 1 and the sealant are made of exactly the same material in this instant, then there is likelihood that both the sealant 10 and the glass tube 1 would deform due to high temperatures during the bonding procedure, impairing workability. However, the sealant 10 of typically ceramics and crystallized glass has no tendency to deform at about the softening point of the glass tube 1, thus insuring simplicity of the bonding procedure.

In other words, ceramics used as material of the sealant 10 is usually sintered at a temperature higher than 1000° C. and exhibits heat resistance high enough not to deform at the softening point (say, 500° C. to 600° C.) of the glass tube 1 and a bonding temperature (800° C. to 1000° C.). Crystallized glass may show substantially the same heat resistance. Furthermore, ceramics and crystallized glass are superior in strength to the conventional glass and easy to shape and possible to bring its coefficient of thermal expansion into agreement with that of the glass tube 1.

It is therefore possible to bond the sealant 10 to the open end portion of the glass tube 1 in the same way as with the prior art metallic sealant 4. In addition, the sealant 10 of ceramics or crystallized glass is generally excellent in weather resistance (including resistance against thermal expansion and contraction due to variations in temperature during the whole day) and has a thermal conductivity extremely lower than metal. The sealant 10 according to the present invention thus liberates a minimum of heat as well as preventing from degree of vacuum being degraded due to corrosion in contrast to the prior art sealant 4.

FIG. 4 shows another preferred embodiment of the present invention wherein the heat-collecting pipe 3 and the sealant 10 are bonded without using the sealing metal material 12. In this case, by a well-known method such as vacuum deposition and sputtering, the inner surface of the apertures 11 in the sealant 10 is metallized in advance with a metal having substantially the same coefficient of thermal expansion as that of the sealant 10. Then, the heat-collecting pipe 3 is inserted through the apertures 11 and waxed with silver.

Although in the above illustrated embodiments the sealant 10 is made of ceramics or crystallized glass, it is clear that it may be made of other materials which are thermally nonconducting and have a softening point higher than that of the transparent tube 1 as well as proper corrosion resistance. As noted earlier, the solar heat collector assembly embodying the present invention offers numerous advantages including a minimum of heat loss; a higher degree of vacuum not affected by corroded sealant; no deformation of the sealant in bonding it with the transparent tube; and high workability.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A solar heat collector assembly comprising:
   a cylindrical transparent tube having an open end portion hermetically sealed by the use of a lid sealant and being held in a vacuum state; and
   a heat-collecting pipe secured in said transparent tube with its end portion extending outside said transparent tube through said sealant,
   wherein said sealant is made of a thermally-nonconducting and anticorrosion material with a softening point higher than that of said transparent tube.

2. The solar heat collector assembly according to claim 1 wherein said lid sealant is made of a ceramic material or crystallized glass.

3. The solar heat collector assembly according to claim 1 wherein said lid sealant has at least one aperture through which said heat-collecting pipe extends and said aperture has its inner face metallized with a metal having substantially the same coefficient of thermal expansion as said sealant.

4. The solar heat collector assembly of claim 1 wherein said lid sealant has the same coefficient of thermal expansion as that of the transparent tube.

5. The solar heat collector assembly of claim 1 wherein the cylindrical transparent tube is a glass tube and the sealant is made of a glass material different from the glass tube.

6. The solar heat collector assembly of claim 1 wherein said lid sealant has at least one aperture through which said heat-collecting pipe extends and a sealing metal is provided for sealing the space between the lid sealant and the heat-collector pipe, said sealing metal having substantially the same coefficient of thermal expansion as the lid sealant.

7. The solar heat collector assembly of claim 6 wherein the heat-collecting tube is made of a metal material.

8. The solar heat collector assembly of claim 6 wherein the surface of the sealing metal is provided with an oxide.

9. The solar heat collector assembly of claim 1 wherein the lid sealant possesses excellent weather resistance against thermal expansion and contraction due to variations in ambient temperature and a thermal conductivity less than metal.

* * * * *